Figure 1:
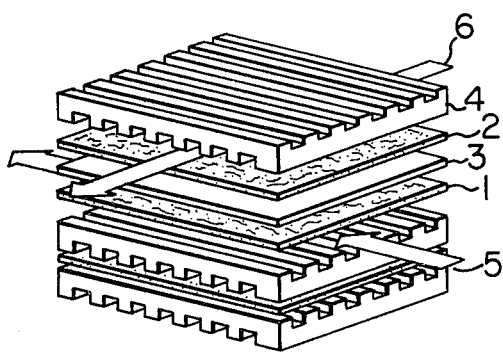

United States Patent [19]

Takeuchi et al.

[11] Patent Number: 4,480,017

[45] Date of Patent: Oct. 30, 1984

[54] FUEL CELL

[75] Inventors: Masato Takeuchi, Katsuta; Hideo Okada; Sigeru Okabe, both of Hitachi; Hiroshi Tobita, Kataibaraki; Munehiko Tonami, Hitachi, all of Japan

[73] Assignee: Hitachi, Ltd., Tokyo, Japan

[21] Appl. No.: 461,256

[22] Filed: Jan. 26, 1983

[30] Foreign Application Priority Data

Jan. 29, 1982 [JP] Japan ................................ 57-14014

[51] Int. Cl.³ ............................................ H01M 8/14
[52] U.S. Cl. ...................................... 429/38; 429/41; 429/44; 429/45; 429/46
[58] Field of Search ...................... 429/16, 34, 38, 41, 429/44, 45, 46, 103

[56] References Cited

U.S. PATENT DOCUMENTS

| 4,216,278 | 8/1980 | Arendt et al. | 429/46 X |
| 4,279,971 | 7/1981 | Arendt | 429/16 X |
| 4,317,865 | 3/1982 | Trocciola et al. | 429/16 X |
| 4,411,968 | 10/1983 | Reiser et al. | 429/41 |

Primary Examiner—Anthony Skapars
Attorney, Agent, or Firm—Antonelli, Terry & Wands

[57] ABSTRACT

A molten carbonate fuel cell comprising an anode, a cathode and a porous body impregnated with an electrolyte composition of metal carbonates, said body being sandwiched between both the electrodes and being made of one or more refractory, non-electron conductive, inorganic materials containing lithium titanate in an amount sufficient to stabilize said inorganic materials at a temperature of operation of said fuel cell, and operated by supplying a fuel into a fuel chamber placed in the anode side and an oxidant into an oxidant chamber placed in the cathode side, has improved stability for a long period of time and high fuel cell performance.

18 Claims, 5 Drawing Figures

FUEL CELL

This invention relates to a molten carbonate fuel cell, and more particularly it relates to a molten carbonate fuel cell in which the molten carbonate electrolyte is confined within an electrolyte retaining material containing lithium titanate.

There are known in the art the following two types of electrolyte bodies (or tiles) for fuel cells: one type comprises an electrolyte retaining or support material made of a porous ceramic sintered body and an electrolyte confined therein (hereinafter referred to as "matrix type electrolyte body") and the other comprises a mixed molding of a particulate non-conductive material and an electrolyte (hereinafter referred to as "paste type electrolyte body").

The term "electrolyte body (or tile)" means a combination of electrolyte and electrolyte retaining material.

These prior art electrolyte bodies can hardly be deemed well satisfactory in the following points:

(1) Possible warping and cracking of the electrolyte body in the cell production process.

(2) Possible cracking of the electrolyte body due to heat cycle during cell operation.

(3) Thermal deformation of the electrolyte body during cell operation.

(4) Low electrolyte retainability.

(5) Change of crystal form and particle size of the electrolyte retaining material.

Lithium aluminate is known as a typical example of electrolyte retaining material for use in fuel cells (U.S. Pat. Nos. 3,878,296, 4,297,419, etc.). There are known three forms of lithium aluminate, $\alpha$-form, $\beta$-form and $\gamma$-form. It was found that use of such lithium aluminate, especially $\alpha$-form, as electrolyte retaining material is causative of notable phase changes (such as change of crystal form from $\alpha$-form into $\beta$-form or $\gamma$-form) in long time cell operations, resulting in a great change of particle density and/or a change of pore distribution characteristics of the electrolyte retaining material to badly affect the electrolyte retainability thereof.

As a solution to these problems, use of potassium titanate, especially fibrous potassium titanate, as the electrolyte retaining material has been proposed (Japanese patent application Kokai (Laid-Open) No. 102083/81). Such proposal, however, is still found unsatisfactory because of insufficient electrolyte stability, for example, change of electrolyte composition due to consumption or reaction with lithium carbonate in the electrolyte. It also involves a problem that potassium titanate is gradually reacted with the electrolyte to produce carbon dioxide gas, which might cause formation of pin holes in the electrolyte body or crossover of gas, resulting in reduced cell performance.

An object of this invention is to provide a molten carbonate fuel cell having stable and high performance by eliminating said problems inherent in the electrolyte retaining material using potassium titanate.

This invention provides a molten carbonate fuel cell comprising at least a pair of electrodes of an electron conductive, catalytic, refractory material, a porous body impregnated with an electrolyte composition of alkali and/or alkaline earth metal carbonates, said body sandwiched between said electrodes, and said body being made of one or more refractory, non-electron conductive, inorganic materials containing lithium titanate in an amount sufficient to stabilize said inorganic materials at a temperature of operation of said fuel cell, and an oxidant passage means for supplying an oxidant to one of said electrodes and a fuel passage means for supplying a hydrogen enriched fuel gas to the other electrode.

Figure 2A:
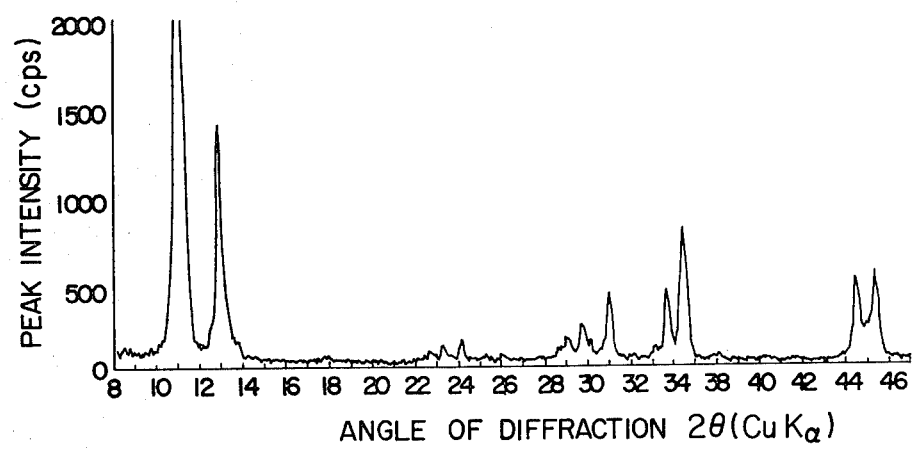
Figure 2B:
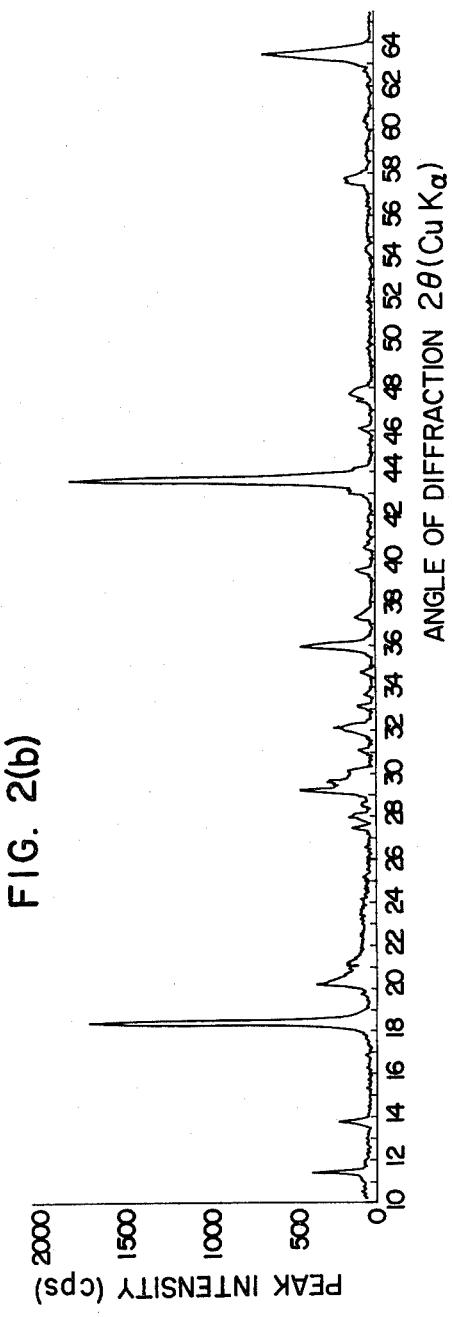
Figure 2C:
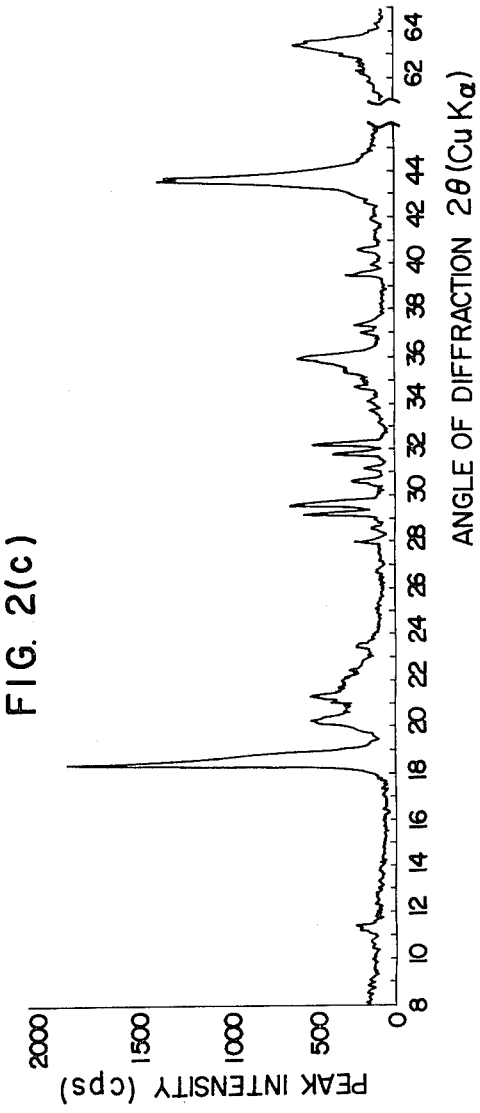
Figure 3:

In the accompanying drawings,

FIG. 1 is a schematic perspective view showing the general construction of a unitary fuel cell in accordance with this invention, FIG. 2 (a) to (c) are X-ray diffraction charts of potassium titanate fiber and lithium titanate fiber, and FIG. 3 is an electron photomicrograph of lithium titanate fibers.

The fuel cell according to this invention will be explained referring to FIG. 1.

The molten carbonate type fuel cell of this invention comprises an anode 1 (fuel electrode), a cathode 2 (air electrode) and an electrolyte body 3 retaining an electrolyte and disposed between said both electrodes. A fuel 5 and an oxidant 6 are supplied into a fuel chamber provided on the anode side and an oxidant chamber provided on the cathode side, respectively. Separators 4 are provided to prevent said fuel and oxidant from mixing each other. Said separators 4 are designed to also function as a conductor.

The electrodes are formed of electron conductive, catalytic, refractory materials. Inexpensive and highly soluble nickel is preferentially used as electrode material. For instance, a porous nickel sintered plate is favorably used as anode 1 while an oxidized version thereof, that is, a nickel oxide sintered plate or a further lithiumized version thereof, that is, a nickel-lithium oxide solid solution is usually used as cathode 2.

As for the separator 4, stainless steel is usually used as base.

Used as fuel 5 in this invention is a hydrogen-containing or hydrogen-enriched fuel gas produced by modified liquefied natural gas (LNG) or light petroleum fraction or a coal gas formed by partially oxidizing coal. A mixture of air or oxygen and carbon dioxide gas is used as oxidant 6. Use of carbon dioxide gas is essential for the oxidant in the molten carbonate type fuel cell.

As the electrolyte for the molten carbonate fuel cell, there can be used an electrolyte composition containing two or more alkali metal carbonates such as $Li_2CO_3$, $Na_2CO_3$, $K_2CO_3$, etc. The electrolyte composition may contain one or more alkaline earth metal carbonates. It is preferable to use the electrolyte composition having a melting point of 550° C. or less, more preferably 500° C. or less. The melting point of the electrolyte composition varies depending on the composition of metal carbonates and usually is 400° C. or higher. Since these electrolyte substances become liquid under the operating conditions, a support material capable of retaining the liquefied electrolyte must be used as a constituent of the electrolyte body.

As the electrolyte retaining material, there should be used a porous body made of one or more refractory, non-electron conductive, inorganic materials containing lithium titanate in an amount sufficient to stabilize said inorganic materials at a temperature of operation of said molten carbonate fuel cell. The amount sufficient to stabilize said inorganic materials means concretely that said inorganic materials contain 50% by weight or more of lithium titanate prior to the retention of the electrolyte composition. Needless to say, the inorganic materials may substantially be lithium titanate or all the inorganic materials may be lithium titanate only. The rest of the inorganic materials may be, for example, non-electron conductive alkali-resistant materials such as lithium aluminate, magnesia, strontium titanate, lithium zirconate, and the like.

Lithium titanate can be used in the form of either powder or fiber. Considering mechanical properties and the like physical properties of the electrolyte retaining material, it is preferable to use fibrous lithium titanate in an amount of 3% by weight or more, more preferably 10% by weight or more, most preferably 20% by weight or more based on the weight of the total of inorganic materials including lithium titanate in the form of powder and fiber.

The use of lithium titanate fiber having a smaller diameter is preferable. The diameter of lithium titanate fiber is, for example, 1 μm or less in average, and the diameter of 0.3 μm or less can also be used. The length of lithium titanate can be 10 to 100 μm, and the length shorter than these values or that longer than these values, for example 4–7 mm, can also be used.

Since lithium titanate stays stable even in long time contact with a corrosive alkali metal carbonate electrolyte and is also excellent in mechanical strength, the molten carbonate fuel cell of this invention having such an electrolyte retaining material therein remains free of crack even after undergoing frequent heat cycles and can maintain its high performance stably for a long period of time.

Lithium titanate can be produced by various methods such as mentioned below.

For instance, it can be prepared by reacting titania with a lithium salt at a temperature of, for example, 600° to 800° C. A variety of lithium salts, such as lithium carbonate, lithum hydroxide, hydrates thereof, lithium nitrate, etc., may be used for this reaction. As other starting material of the titanium compound, one may use various kinds of salts such as orthotitanic acid, metatitanic acid, titanium tetrachloride, titanyl sulfate, etc. Organic salts such as titanium alkoxides are also usable.

Lithium titanate can be also produced by heat treating potassium titanate with a lithium salt such as mentioned above. In this case, fibrous lithium titanate can be obtained with ease by using fibrous potassium titanate ($K_2O \cdot nTiO_2$; n=2–8). The temperature for the heat treatment is preferably 600° C. or higher. A lithium salt such as mentioned above may be used singly or as a mixture with a potassium salt, a sodium salt or the like. FIG. 2(a) of the accompanying drawings is an X-ray diffraction chart of potassium hexatitanate fiber. When this potassium hexatitanate ($K_2O \cdot 6TiO_2$) fiber is mixed with lithium carbonate ($Li_2CO_3$) in a $K_2O \cdot 6TiO_2/Li_2CO_3$ molar ratio of 1:6 and heat treated at 650° C. for 150 hours, the mixture is turned into lithium titanate as seen from FIG. 2(c). Also, when said potassium hexatitanate fiber is mixed with lithium carbonate in a molar ratio of 1:6 and heat treated at 750° C. for 2 hours, the mixture is converted into lithium titanate as seen from FIG. 2(b). The same results were obtained when lithium hydroxide ($LiOH \cdot H_2O$) or a carbonate mixture ($Li_2CO_3/K_2CO_3=62/38$ by mole) was used instead of lithium carbonate in a molar ratio of 1:12 ($K_2O \cdot 6TiO_2/LiOH \cdot H_2O$) or 1:6 ($K_2O \cdot 6TiO_2/Li_2CO_3$), respectively, in the above-said heat treatments at 650° C. and 750° C. In contrast with this, the heat treatment at 500° C. could induce almost no reaction in 150-hour heating. Use of potassium tetratitanate ($K_2O \cdot 4TiO_2$) fiber instead of potassium hexatitanate fiber gave the same result.

The thus obtained lithium titanate fiber has a structure such as shown in FIG. 3 when seen under an electron microscope.

Various methods are available for making an electrolyte body containing lithium titanate as electrolyte retaining material.

One method comprises making a porous sintered body containing fibrous potassium titanate as electrolyte retaining material, impregnating said sintered body with a molten carbonate mixture containing lithium carbonate and heat treating the same at a temperature of about 600° C. or higher for stabilization. In another method, said porous sintered body is merely subjected to a heat treatment at about 600° C. or higher with a lithium salt alone for stabilization and then the electrolyte is placed therein.

In still another method, titanium dioxide or metatitanic acid, orthotitanic acid or the like and potassium carbonate are mixed in a suitable ratio, preferably in a $K_2O/TiO_2$ molar ratio of 1/2.5 to 1/6 and the mixture is shaped into an electrolyte body of a desired size by any of the various available methods, then subjected to a heat treatment, preferably sintering, at a high temperature (above 900° C.) and further heat treated with a lithium salt or a mixed salt containing it for stabilizing the product.

It will be obvious to those skilled in the art that either a paste type or a matrix type electrolyte body can be obtained by using as starting material a lithium titanate-containing electrolyte retaining material produced or stabilized by any of the said method.

For manufacturing a matrix type electrolyte body, it needs to sinter the matrix material after it has been shaped into a desired size and form. It is to be noted that the higher is the sintering temperature, the more difficult it becomes to produce the body with a high surface precision, or the body free of warp, undulation, cracks and other undesirables, and also the manufacturing cost elevates. Therefore, reducing the sintering temperature leads to a great merit. A lower sintering temperature is required for lithium titanate fiber than those for alumina fiber and lithium aluminate. The following required sintering temperatures have been confirmed experimentally:

| Alumina fiber | 1,400° C. or higher |
| Lithium aluminate | 1,200–1,400° C. |
| Lithium titanate fiber | 900–1,300° C. |

Also, lithium titanate has better sinterability than potassium titanate fiber.

It is recomended that the porous body of the electrolyte retaining material has a porosity of 40% or more, preferably about 50% or more, more preferably about 60% or more up to about 95% and a mean pore size of several microns or less, preferably 1 μm or less.

It is preferred that the proportion of the electrolyte retaining material in the electrolyte body is 30–60% by weight, the remainder being the electrolyte.

The invention will be illustrated in further detail hereinbelow by way of Examples thereof.

EXAMPLE 1

89 Grams of lithium carbonate was added to 115 g of fibrous potassium hexatitanate anhydride ($K_2O \cdot 6TiO_2$)

and the dry-blended mixture was heated at 750° C. in an air atmosphere for 5 hours. This mixture was then pulverized by a pulverizer and passed through a 100-mesh screen. The thus prepared material was molded by the ordinary cold press molding method to obtain a 2 mm thick and 100 mm square molding and the latter was sintered by a 2-hour heat treatment at 1,300° C.

The obtained porous sintered body had a porosity of 55 volume percent. This sintered body was then impregnated with a lithium carbonate and anhydrous potassium carbonate ($K_2CO_3$)(62:38 by molar ratio) mixed electrolyte rendered into a molten state by being heated to 520° C., an the thus impregnated sintered body was cooled to obtain a matrix type electrolyte body.

EXAMPLE 2

By using a fibrous potassium hexatitanate anhydride as base material, a 2.5 mm thick and 200 mm square porous sintered body was obtained by following the same cold press molding and sintering operations as in Example 1, and this sintered body was impregnated with 110 g of molten lithium carbonate and heat treated at 750° C. for about 10 hours.

The thus treated sintered body was further impregnated with a mixed electrolyte of the same composition as that of Example 1 at a temperature of 520° C. and then cooled to obtain an electrolyte body.

EXAMPLE 3

120 Grams of titanium dioxide ($TiO_2$) having an average particle size of 1 μm and 110 g of anhydrous lithium carbonate were mixed and then wet kneaded for about 2 hours. After drying at 140° C. for 5 hours, the mixture was pulverized and passed through a 100-mesh screen. The thus prepared material was press molded into a 2 mm thick and 200 mm square body and calcined at 1,100° C. for 5 hours, followed by additional 3-hour calcinating at 1,250° C. to obtain a porous sintered body.

This sintered body was impregnated with a mixed electrolyte of the same composition as that of Example 1 at a temperature of 520° C. and then cooled to obtain a matrix type electrolyte body.

EXAMPLE 4

The same unitary cells as shown in FIG. 1 were composed by using the electrolyte bodies obtained in Examples 1 to 3 and an electrolyte body (Comparative Example 1) obtained by impregnating the molten electrolyte in a fibrous potassium titanate sintered body obtained from the first-half process of Example 2 and by using a porous nickel sintered plate and a lithium-modified nickel oxide sintered plate as the anode and the cathode, respectively. SUS 316 was used for the seperators. The cell potential was measured in the following way.

Each cell was operated at a temperature of 650° C. by supplying a 50% $H_2$ and 50% $N_2$ mixed gas as fuel to the anode while feeding a 15% $O_2$, 30% $CO_2$ and 55% $N_2$ mixed gas as oxidant to the cathode, and the cell voltage at the time of discharge at a current density of 100 mA/cm$^2$ was measured. The results are shown in Table 1.

TABLE 1

|  | Cell voltage (V) | |
| --- | --- | --- |
|  | Initial | After 100-hour operation |
| Example 1 | 0.80 | 0.82 |

TABLE 1-continued

|  | Cell voltage (V) | |
| --- | --- | --- |
|  | Initial | After 100-hour operation |
| Example 2 | 0.78 | 0.77 |
| Example 3 | 0.81 | 0.80 |
| Comparative Example 1 | 0.76 | 0.58 |

As seen from Table 1, the fuel cells according to this invention suffer no noticeable drop of cell performance even after 100-hour successive operation.

Also, the fuel cells according to this invention caused no crossover of gas nor gas leakage from the wet sealed portion after repetition of operation and shutdown (650° C.→300° C.).

EXAMPLE 5

89 Grams of lithium carbonate was added to 115 g of a fibrous potassium hexatitanate anhydride and dry-blended, and the mixture was heat treated in a 700° C. air atmosphere for 10 hours and then pulverized and passed through a 100-mesh screen. To 100 g of this material was added 80 g of a mixture of alkali metal carbonates ($Li_2CO_3$:$K_2CO_3$=62:38 by molar ratio), followed by well mixing by a mill. The thus prepared material was cold press molded into an about 2 mm thick and 100 mm square body and the latter was dried and calcined at 480° C. for 2 hours to obtain a paste type electrolyte body.

A unitary cell was composed by using this electrolyte body and its potential was measured according to the method of Example 4. The cell voltage at the time of discharge at a current density of 100 mA/cm$^2$ was 0.79 V initially and 0.80 V after 100-hour operation.

What is claimed is:

1. A molten carbonate fuel cell comprising
at least a pair of electrodes,
a porous body impregnated with an electrolyte composition of metal carbonates, said body sandwiched between said electrodes, and said body being made of one or more refractory, non-electron conductive, inorganic materials containing lithium titanate in an amount sufficient to stabilize said inorganic materials at a temperature of operation of said fuel cell, and
an oxidant passage means for supplying an oxidant to one of said electrodes and a fuel passage means for supplying a hydrogen enriched fuel gas to the other electrode.

2. A fuel cell according to claim 1, wherein the electrolyte retaining porous body is made of refractory, non-electron conductive, inorganic materials containing 50% by weight or more of lithium titanate.

3. A fuel cell according to claim 1, wherein the electrolyte retaining porous body is made substantially of lithium titanate.

4. A fuel cell according to claim 1, wherein the electrolyte retaining porous body is made of lithium titanate alone.

5. A fuel cell according to claim 2, wherein the lithium titanate is in the form of either powder or fiber or a mixture thereof.

6. A fuel cell according to claim 2, wherein the refractory, non-electron conductive, inorganic materials contain lithium titanate fibers in an amount of 3% by weight or more and the remainder of lithium titanate being in the form of powder.

7. A fuel cell according to claim 6, wherein the inorganic materials contain lithium titanate fibers in an amount of 10% by weight or more and the remainder of lithium titanate being in the form of powder.

8. A fuel cell according to claim 3, wherein the lithium titanate is contained in the form of fiber in an amount of 10% by weight or more.

9. A fuel cell according to claim 1, wherein the electrolyte composition has a melting point of 550° C. or lower.

10. A fuel cell according to claim 5, wherein the lithium titanate in the form of fiber has a diameter of 1 $\mu$m or less in average.

11. A fuel cell according to claim 1, wherein the lithium titanate is one obtained by reacting titania with a lithium salt or a mixed salt containing a lithium salt.

12. A fuel cell according to claim 1, wherein the lithium titanate is fibrous lithium titanate obtained by heat treating fibrous potassium titanate and a lithium salt or a mixed salt containing a lithium salt at a temperature of about 600° C. or higher.

13. A fuel cell according to claim 1, wherein the cell has an electrolyte body comprising 30–60% by weight of electrolyte retaining material and 70–40% by weight of electrolyte, the total being 100% by weight.

14. A fuel cell according to claim 1, wherein said porous body has a porosity of at least 40%.

15. A fuel cell according to claim 1, wherein said body also includes, in addition to said lithium titanate, at least one other material selected from the group consisting of lithium aluminate, magnesia, strontium titanate and lithium zirconate.

16. A fuel cell according to claim 10, wherein the lithium titanate in the form of fiber has a length of 10 to 100 $\mu$m.

17. A fuel cell according to claim 1, wherein said porous body impregnated with an electrolyte composition is a matrix type electrolyte body.

18. A fuel cell according to claim 1, wherein said porous body impregnated with an electrolyte is a paste-type electrolyte body.

* * * * *